United States Patent
Knechtel

(10) Patent No.: US 12,145,528 B2
(45) Date of Patent: Nov. 19, 2024

(54) HINGE DEVICE FOR A FRONT HOOD OF A MOTOR VEHICLE, AND PROTECTIVE SYSTEM FOR PROTECTING A PERSON LOCATED OUTSIDE OF A MOTOR VEHICLE

(71) Applicant: Bayerische Motoren Werke Aktiengesellschaft, Munich (DE)

(72) Inventor: Marcus Knechtel, Kirchheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/913,892

(22) PCT Filed: Mar. 16, 2021

(86) PCT No.: PCT/EP2021/056633
§ 371 (c)(1),
(2) Date: Sep. 23, 2022

(87) PCT Pub. No.: WO2021/190992
PCT Pub. Date: Sep. 30, 2021

(65) Prior Publication Data
US 2024/0208455 A1    Jun. 27, 2024

(30) Foreign Application Priority Data
Mar. 26, 2020   (DE) .................. 10 2020 108 386.6

(51) Int. Cl.
*B60R 21/38*      (2011.01)
*B62D 25/10*      (2006.01)
*E05D 11/00*      (2006.01)

(52) U.S. Cl.
CPC .............. *B60R 21/38* (2013.01); *B62D 25/10* (2013.01); *E05D 11/00* (2013.01); *E05Y 2900/536* (2013.01)

(58) Field of Classification Search
CPC ......... B62D 25/10; B60R 21/38; E05D 11/00; E05D 2011/009; E05Y 2900/536
See application file for complete search history.

(56) References Cited

U.S. PATENT DOCUMENTS 8,768,574 B1      7/2014   Shaw et al.
10,384,638 B2 *   8/2019   Leschnik ................. E05D 7/04
(Continued)

FOREIGN PATENT DOCUMENTS

CA    2 960 065 A1    3/2016
CN    107257753 A    10/2017
(Continued)

OTHER PUBLICATIONS

English translation of Chinese Office Action issued in Chinese Application No. 202180022222.1 dated Jun. 9, 2023 (7 pages).
(Continued)

*Primary Examiner* — Faye M Fleming
(74) *Attorney, Agent, or Firm* — Crowell & Moring LLP

(57) ABSTRACT

A hinge device is provided for a front hood of a motor vehicle. The front hood can be opened and closed by way of the hinge device, and the front hood can be adjusted from a normal position into a protective position in the event of a collision. The hinge device has a single front hood control link and a force introducing element which are connected in a rotatable manner relative to each other. The front hood control link and the force introducing element are arranged relative to each other in the protective position such that a first connection line from the first to the second rotational point and a second connection line from the first to the third rotational point form an angle which ranges from 150 degrees to 180 degrees in order to minimize vibrations of the front hood produced by the movement from the normal position into the protective position.

10 Claims, 3 Drawing Sheets

(56) References Cited

U.S. PATENT DOCUMENTS

| | | |
|---|---|---|
| 2002/0017409 A1 | 2/2002 | Peter |
| 2004/0134705 A1 | 7/2004 | Nadeau et al. |
| 2006/0102402 A1* | 5/2006 | Birk ..................... E05D 11/00 |
| | | 180/89.17 |
| 2010/0024162 A1* | 2/2010 | Walz ..................... E05B 83/16 |
| | | 16/233 |
| 2017/0349137 A1 | 12/2017 | Schaurer et al. |

FOREIGN PATENT DOCUMENTS

| | | |
|---|---|---|
| DE | 101 17 396 A1 | 10/2002 |
| DE | 103 14 180 A1 | 9/2004 |
| DE | 10 2005 007 903 A1 | 11/2005 |
| DE | 10 2004 037 320 A1 | 3/2006 |
| DE | 10 2004 062 105 A1 | 7/2006 |
| DE | 603 01 778 T2 | 7/2006 |
| DE | 10 2011 006 133 A1 | 9/2012 |
| DE | 10 2015 109 128 B3 | 7/2016 |
| DE | 10 2015 010 395 B3 | 11/2016 |
| EP | 1 757 496 A2 | 2/2007 |
| EP | 1 813 484 A1 | 8/2007 |
| EP | 2 138 362 A1 | 12/2009 |

OTHER PUBLICATIONS

International Search Report (PCT/ISA/210) issued in PCT Application No. PCT/EP2021/056633 dated Jun. 17, 2021 with English translation (four (4) pages).

German-language Written Opinion (PCT/ISA/237) issued in PCT Application No. PCT/EP2021/056633 dated Jun. 17, 2021 (six (6) pages).

German-language Search Report issued in German Application No. 10 2020 108 386.6 dated Nov. 30, 2020 with partial English translation (10 pages).

* cited by examiner

HINGE DEVICE FOR A FRONT HOOD OF A MOTOR VEHICLE, AND PROTECTIVE SYSTEM FOR PROTECTING A PERSON LOCATED OUTSIDE OF A MOTOR VEHICLE

BACKGROUND AND SUMMARY

The invention relates to a hinge device for a front hood of a motor vehicle, which front hood can be opened and closed by means of the hinge device, it being possible for the front hood to be adjusted from a normal position into a protective position in the case of a collision.

Furthermore, the invention relates to a protective system for protecting a person located outside the motor vehicle.

DE 10 2015 109 128 B3 has disclosed a front hood hinge with a rotationally movable unlocking mechanism, in the case of which front hood hinge an actuator moves the front hood hinge in such a way that it lifts a front hood.

In the case of the abovementioned system, the actuator assumes the lifting function and accelerates the front hood in such a way that the front hood is lifted higher than necessary.

This initiates a swing of the front hood between a maximum lift of the front hood and a minimum lift which as a rule lies below a minimum lift height, in the case of which injuries to a person impacting on the front hood can be avoided as far as possible.

This swing behavior is due to the construction in the case of the embodiment of the front hood hinge from DE 10 2015 109 128 B3, since the front hood hinge conducts forces from the front hood toward the actuator. The components of DE 10 2015 109 128 B3 always attempt to move into a stretched position, in which they can absorb and compensate for tensile forces as far as possible. Here, however, it is difficult for the guidance of the piston of the actuator in the cylinder guide of the piston to be designed for the exact load.

DE 10 2011 006 133 A1 has disclosed a hinge, in the case of which the front hood can be set with an accurate fit with respect to the vehicle body. As a rule, this takes place on the vehicle body in white (that is to say, before vehicle painting), the actuator which belongs to the hinge having not yet been installed at this time. In DE 10 2011 006 133 A1, the hinge is therefore first of all closed (the hood part lies on a stop) and is screwed both to the vehicle body and to the front hood. After the painting process, the actuator is installed or mounted, this actuator being fastened at its predefined position. The actuator must not come into contact with the hood part of the hinge during its mounting. This is because damage in the case of contact leads to damage of the actuator, and this actuator might no longer fulfill its function. Therefore, there is a clearance which is different from vehicle to vehicle (of identical type) between the actuator and the unlocking mechanism of the hinge from DE 10 2011 006 133 A1. In order then to ensure the function of the hinge and the actuator, the stroke of the actuator is calibrated in such a way that its function is ensured (stroke and time) in every case. During the lifting movement, that is to say in the case of a collision with, for example, a pedestrian, the actuator plunger of the piston rod does not bear continuously against the hinge hood part (principle of linear momentum) or is not connected fixedly to the hood part or the front hood. As a result, the piston rod is retracted and extended again during each hood movement, as a result of which the actuator cannot be utilized for the lift limitation of the hood.

In view of the above prior art, it is therefore an object of the present invention to provide a hinge device for a front hood of a motor vehicle and a protective system for protecting a person located outside the motor vehicle, which hinge device and protective system can be produced in an inexpensive and material-saving manner and have an improved swing behavior in such a way that, when a protective position is reached, the hinge device remains in its position and ideally does not undershoot the reached position.

According to the invention, this object is achieved by way of the features of the independent patent claims. Further advantageous developments are the subject matter of the subclaims.

According to the invention, the first aspect of the present invention comprises a hinge device for a front hood of a motor vehicle, it being possible for the front hood to be opened and closed by means of the hinge device, and it being possible for the front hood to be adjusted from a normal position into a protective position in the case of a collision.

Here, the hinge device comprises a single front hood link and a force application element. Essentially, the hinge device is what is known as a single pivot hinge which can be formed by the single front hood link.

The front hood link has, at its first end, a first pivot point, to which a first end of the force application element is connected pivotably.

Furthermore, the front hood link has, at its second end, a second pivot point, to which the front hood can be fastened rotatably.

In addition, the force application element has, at its second end, a third pivot point, to which an actuator apparatus can be fastened rotatably, which actuator apparatus applies the force for adjusting the front hood from the normal position into the protective position.

Furthermore, the front hood link and the force application element are arranged in the protective position with respect to one another in such a way that a first connecting line from the first to the second pivot point and a second connecting line from the first to the third pivot point enclose an angle between 150 degrees and 180 degrees, in order to minimize swings of the front hood, brought about by way of the movement from the normal position into the protective position.

In terms of concrete design, each pivot point can be configured as a rotational bearing in the form of a mandrel, it being possible for one bearing bush to be used per rotating element.

The force application element can be configured as a one-armed latch which prevents a movement of the front hood link in the normal position.

Furthermore, an arm of the force application element can engage partially around a first stop element of a hinge lower part of the hinge device in the normal position, in order to block a movement of the front hood link.

Furthermore, the hinge device can have a transmission member which, during the transition from the normal position to the protective position, guides the movement of the force application element and the front hood link.

The transmission member can be connected to the force application element and the front hood link via the first pivot point.

The transmission member can also be of rotatable configuration with respect to a hinge lower part.

Furthermore, the transmission member can comprise an adjustable second stop element which bears against the front hood link in the normal position, in order to restrict the movement of freedom of this front hood link. Here, the adjustable second stop element can block the movement of the front hood link in the opposite direction to gravity.

In addition, the transmission member can be of triangular configuration, and the first pivot point, the second adjustable stop element and a rotary connection to the hinge lower part in the form of a fourth pivot point can be configured at corners of the triangular transmission member.

Furthermore, the adjustable second stop element can be of eccentric configuration and can be arranged on the transmission member, with the result that the exact position for coming into contact with the front hood link can be set, in particular can be set without play. Here, the play-free setting can already be performed by the hinge supplier.

Furthermore, the transmission member and the force application element can be configured and connected in such a way that, during the transition from the normal position to the protective position, the force application element bears against the transmission member in addition to the connection via the first pivot point.

The hinge device can also comprise a hinge lower part which can be fastened to a vehicle.

Here, the hinge lower part can comprise the fourth pivot point, about which the transmission member can be rotated relative to the hinge lower part.

Furthermore, the hinge lower part can comprising a first, a third and a fourth stop element which define the positions or protective and normal position of the hinge device.

Here, the first stop element can be engaged around by the force application element in the normal position. Furthermore, the first stop element can be clamped by the force application element and the transmission member in such a way that the force application element and the transmission member engage around the hinge device at the first stop element in a tongs-like manner.

In addition, the third and fourth stop element can define the position of the front hood link in the protective position and can serve as a guide.

Furthermore, the front hood link can have, on its outer side, a slotted guide track, along which the front hood link slides along on the fourth stop element, in order to pass from the normal position into the protective position and to stay in position in the normal position.

The force application element can rotate in the clockwise direction about the first pivot point during the transition from the normal position to the protective position, the transmission member can rotate counter to the clockwise direction about the fourth pivot point, and the front hood link can be displaced from the normal position into the protective position.

A second aspect of the present invention comprises a protective system for protecting a person located outside a motor vehicle and for the motor vehicle.

The features of the hinge device, as mentioned under the first aspect, can be used individually or in a manner which can be combined with one another in the case of the protective system.

The protective system for protecting a person located outside a motor vehicle and for the motor vehicle, it being possible for the protective system to be adjusted from a normal position into a protective position in the case of a collision, comprises a front hood of a motor vehicle.

Furthermore, the protective system has an actuator apparatus for the front hood, which actuator apparatus adjusts the front hood from a normal position into a protective position in the case of a collision, and has the hinge device in accordance with the first aspect.

Here, the actuator apparatus is fastened rotatably to the force application element of the hinge device. The actuator apparatus can be fastened rotatably to the third pivot point which is configured at the opposite end of the force application element and therefore at the other end than the first pivot point.

By way of this proposed protective system or by way of this proposed hinge device, an improved swing behavior can be achieved in such a way that, when the protective position is reached, the hinge device remains in its position and does not swing between the protective position and a position in front of the normal position. By way of the integration of the actuator apparatus into the entire system, customarily common overshooting (considerably higher lifting of the front hood than required and the associated tolerances during the installation and assembly) can be reduced.

Static certification of the HIC (Head Injury Criterion) can take place as a result of the swing reduction. This can be verified by way of an activating test, the clearance below the engine cover or the front hood being sufficient for the HIC values. Here, the height of the clearance is achieved reliably, and no undershooting takes place either. In the case of a dynamic certification of the front hood, the time of the impact on the front hood is to be calculated, which leads to a considerable rise in the time requirement for the certification and therefore causes higher costs. Therefore, certification costs can also be saved by way of the protective system.

The actuator apparatus can be arranged on the force application element in such a way that the force application element can be released from the first stop element by way of a rotation in the event of activating of the actuator apparatus.

Furthermore, the actuator apparatus, the force application element and the front hood link can be arranged in such a way that an angle between the second connecting line and a piston rod of the actuator apparatus is between 150 degrees and 180 degrees.

In addition, the actuator apparatus can be arranged in such a way that its generated force is for the most part oriented counter to the traveling direction.

A third aspect of the present invention comprises a vehicle.

The features of the protective system, as mentioned under the second aspect, can be used individually or in a manner which is combined with one another in the case of the vehicle.

The actuator apparatus can always remain connected to the hinge device and can move the hinge device into an approximate stretched position, as a result of which a damping action and a lift-limiting function for the front hood can be achieved. In this way, swinging, in particular overshooting of the front hood, can be reduced.

In the following text, what has been represented above will be expressed additionally using different words.

In simple terms, a system that is to be provided, by way of which a minimum lift height for a front hood is to be achieved in a requested time, and this height can be maintained. The hinge device which provides the mechanism for lifting the front hood is to reduce swings of the front hood in the case of springing back after the maximum lifting height is reached.

This can be achieved by virtue of the fact that, in simple terms, the link arrangement of the hinge device, or its members which connect to the front hood, to a hinge lower part which can be fastened to a vehicle frame are stretched in a protective position in such a way that a relative movement of the members with respect to one another can be prevented.

One embodiment will be described in the following text.

In the following description, identical designations are used for identical objects.

DETAILED DESCRIPTION OF THE DRAWINGS

Figure 1:
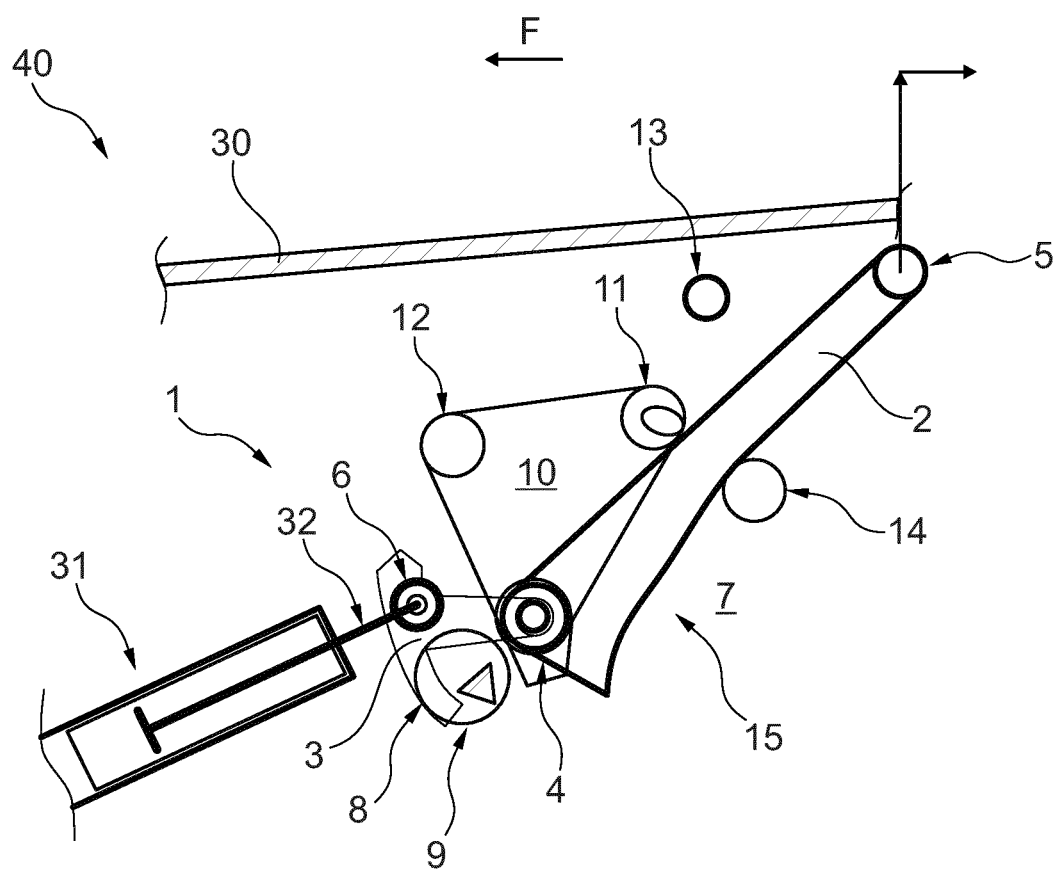
FIG. 1 shows, in a diagrammatic side view of a vehicle, a hinge device according to an embodiment of the invention in a normal position.

FIG. 1 shows, in a diagrammatic side view of a vehicle, a hinge device in a normal position.

In more concrete terms, FIG. 1 shows a protective system 40 for protecting a person located outside the motor vehicle and for a motor vehicle, it being possible for the protective system 40 to be adjusted from a normal position into a protective position in the case of a collision.

The protective system 40 has a front hood 30 of a motor vehicle, an actuator apparatus 31 for the front hood 30, which actuator apparatus 31 adjusts the front hood 30 from a normal position into a protective position in the case of a collision, and a hinge device 1.

As can be seen from FIG. 1, the actuator apparatus 31 is fastened rotatably to a force application element 3 of the hinge device 1.

It is apparent from FIG. 1, furthermore, that the hinge device 1 for the front hood 30 which can be opened and closed by means of the hinge device 1 which adjusts the front hood 30 from a normal position into a protective position in the case of a collision has a single front hood link 2 and a force application element 3.

Here, at its first end, the front hood link 2 has a first pivot point 4, to which a first end of the force application element 3 is connected rotatably.

At its second end, the front hood link 2 has a second pivot point 5, to which the front hood 30 can be fastened rotatably.

At its second end, the force application element 3 comprises a third pivot point 6, to which the actuator apparatus 31 is fastened rotatably, which actuator apparatus 31 applies the force for adjusting the front hood 30 from the normal position into the protective position.

The force application element 3 is configured as a one-armed latch which prevents a movement of the front hood link 2 in the normal position, as shown in FIG. 1.

Here, in the normal position, an arm 8 of the force application element 3 engages around the first stop element 9 of a hinge lower part 7 of the hinge device 1 partially, in order to block a movement of the front hood link 2.

It is noted that the hinge lower part 7 is not shown in concrete terms as a component with outlines. It is theoretically also possible that the hinge lower part 7 is configured in one piece with the vehicle frame. The hinge lower part 7 receives all above-described components, and is positioned in the vehicle body in white and is screwed to the vehicle body. Afterward, the front hood 30 is screwed to the hinge device 1, the reverse sequence also being possible. Afterward, the position of the hinge device 1 no longer has to be changed or adapted, which reduces assembly and adjustment costs.

As FIG. 1 shows, the actuator apparatus 31 is arranged on the force application element 3 in such a way that the force application element 3 can be released from the first stop element 9 by way of rotation in the case of activating of the actuator apparatus 31.

As has been mentioned, the actuator apparatus 1 is fastened rotatably to the force application element 3 of the hinge device 1 or to the third pivot point 6.

Here, the third pivot point 6 is configured at the opposite end of the force application element 3 and therefore at the other end to the first pivot point 4.

The actuator apparatus 31 is also always in contact with the hinge device 1 with its force application element 3, with the result that there is no gap and a change in contact is not possible either.

Furthermore, the hinge device 1 has a transmission member 10 which guides the movement of the force application element 3 and the front hood link 2 during the transition from the normal position to the protective position.

The transmission member 10 is connected via the first pivot point 4 to the force application element 3 and the front hood link 2.

In addition, the transmission member 10 is configured rotatably with respect to the hinge lower part 7.

The transmission member 10 has an adjustable second stop element 11 which bears against the front hood link 2 in the normal position, in order to restrict its freedom of movement in the opposite direction to gravity.

As FIG. 1 shows, the transmission member 10 is of triangular configuration, and the first pivot point 4, the second adjustable stop element 11 and a rotary connection to the hinge lower part 7 in the form of a fourth pivot point 12 are configured at the corners.

FIG. 1 shows, furthermore, that the adjustable second stop element 11 is of eccentric configuration and is arranged on the transmission member 10, with the result that the exact position for contact with the front hood link 2 can be set, in particular can be set without play by the supplier.

It can also be gathered from FIG. 1 that, as has already been mentioned, the hinge device 1 comprises a hinge lower part 7 which can be fastened to a vehicle or a vehicle frame.

The hinge lower part 7 has the fourth pivot point 12, about which the transmission member 10 can be rotated relative to the hinge lower part 7.

Furthermore, the hinge lower part 7 has the first 9, a third 13 and a fourth stop element 14 which define the positions of the movable constituent parts of the hinge device 1, the first stop element 9 being engaged around by the force application element 3 in the normal position.

In addition, the first stop element 9 is clamped by the force application element 3 and the transmission member 10 in such a way that the force application element 3 and the transmission member 10 engage around the hinge device 1 at the first stop element 9 in a tongs-like manner.

The front hood link 2 has a slotted guide track 15 on its outer side, by way of which slotted guide track 15 it slides along on the fourth stop element 14, in order to pass from the normal position into the protective position and to maintain the position in the normal position.

Figure 2:
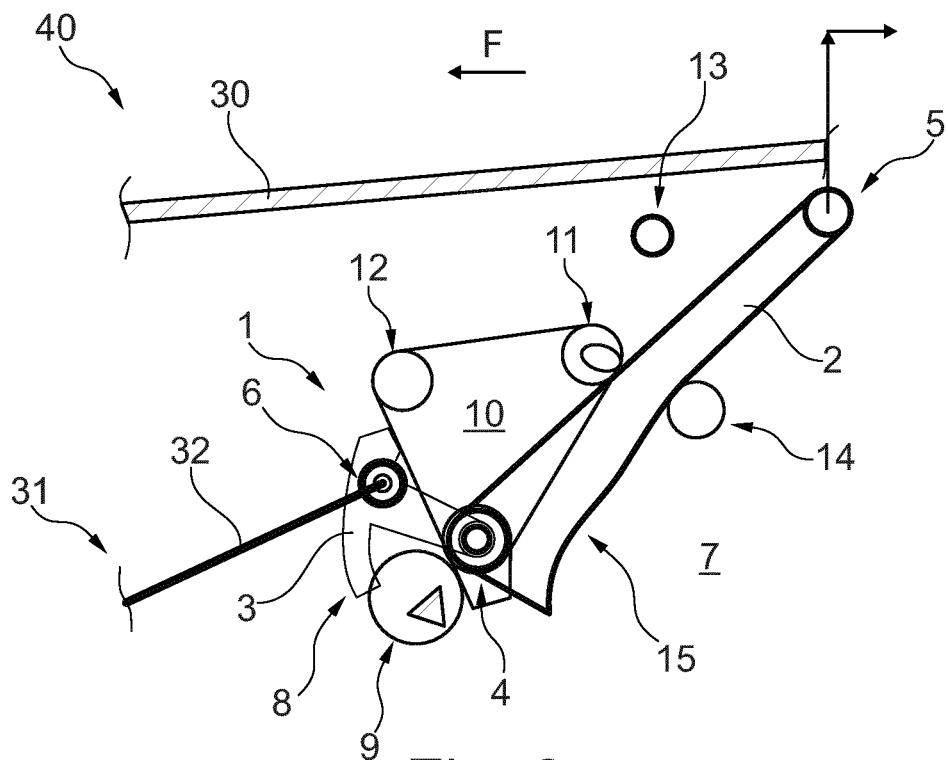
FIG. 2 is a diagrammatic side view of the hinge device from FIG. 1 in the transition from the normal position toward a protective position.

FIG. 2 shows a diagrammatic side view of the hinge device 1 from FIG. 1 in the transition from the normal position toward a protective position.

It is apparent here from FIG. 2 that the transmission member 10 and the force application element 3 are configured and connected in such a way that, in addition to the connection via the first pivot point 4, the force application element 3 bears against the transmission member 10 during the transition from the normal position to the protective position.

Strictly speaking, the force application element 3 bears against the transmission member 10 by way of the end, on which the arm 8 of the force application element 3 is configured to engage around the first stop element 9, in order to block a movement of the front hood link 2.

Figure 3:
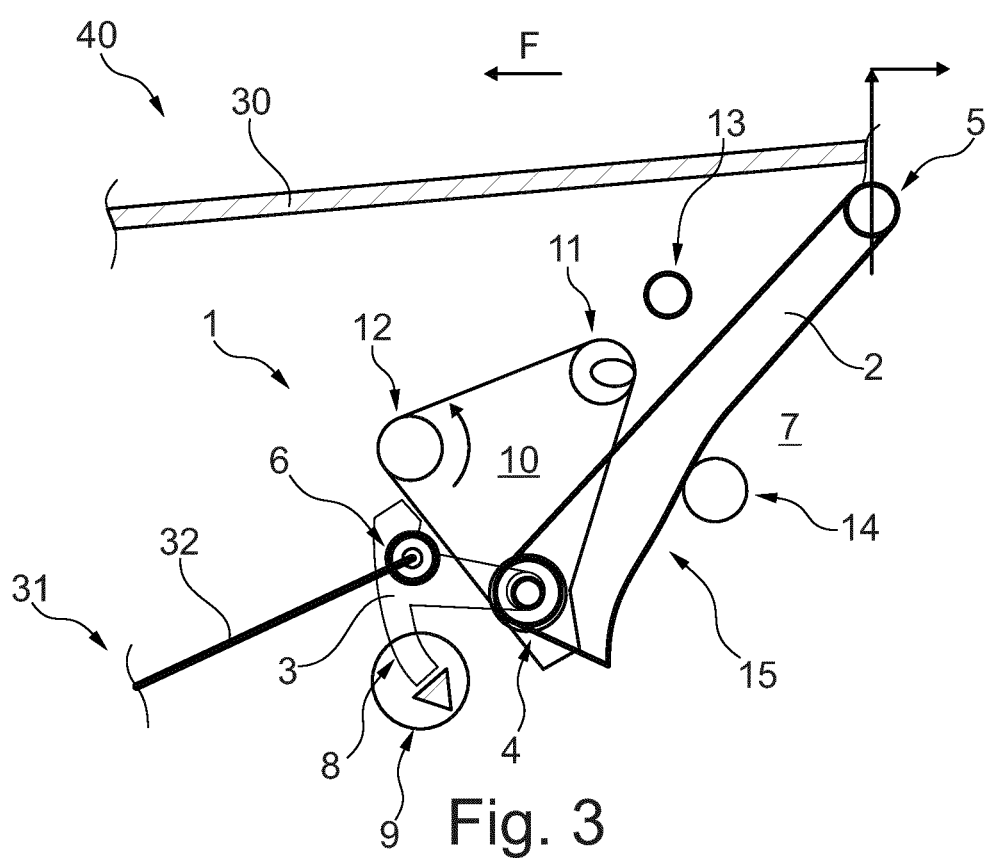
FIG. 3 is a diagrammatic side view of the hinge device from FIG. 2 in a continuation from the exited normal position toward the protective position.

FIG. 3 shows a diagrammatic side view of the hinge device 1 from FIG. 2 in a continuation from the exited normal position toward the protective position.

It becomes clear here, in particular, when studying FIGS. 1 to 3 together that, during the transition from the normal position to the protective position, the force application element 3 rotates about the first pivot point 4 in the clockwise direction, the transmission member 10 rotates about the fourth pivot point 12 counter to the clockwise direction, and the front hood link 2 is displaced from the normal position into the protective position.

In FIGS. 2 and 3, the displacement of the front hood link 2 from the normal position into the protective position is indicated by way of two arrows which show a displacement toward the top and toward the right, in relation to the plane of the drawing.

Figure 4:
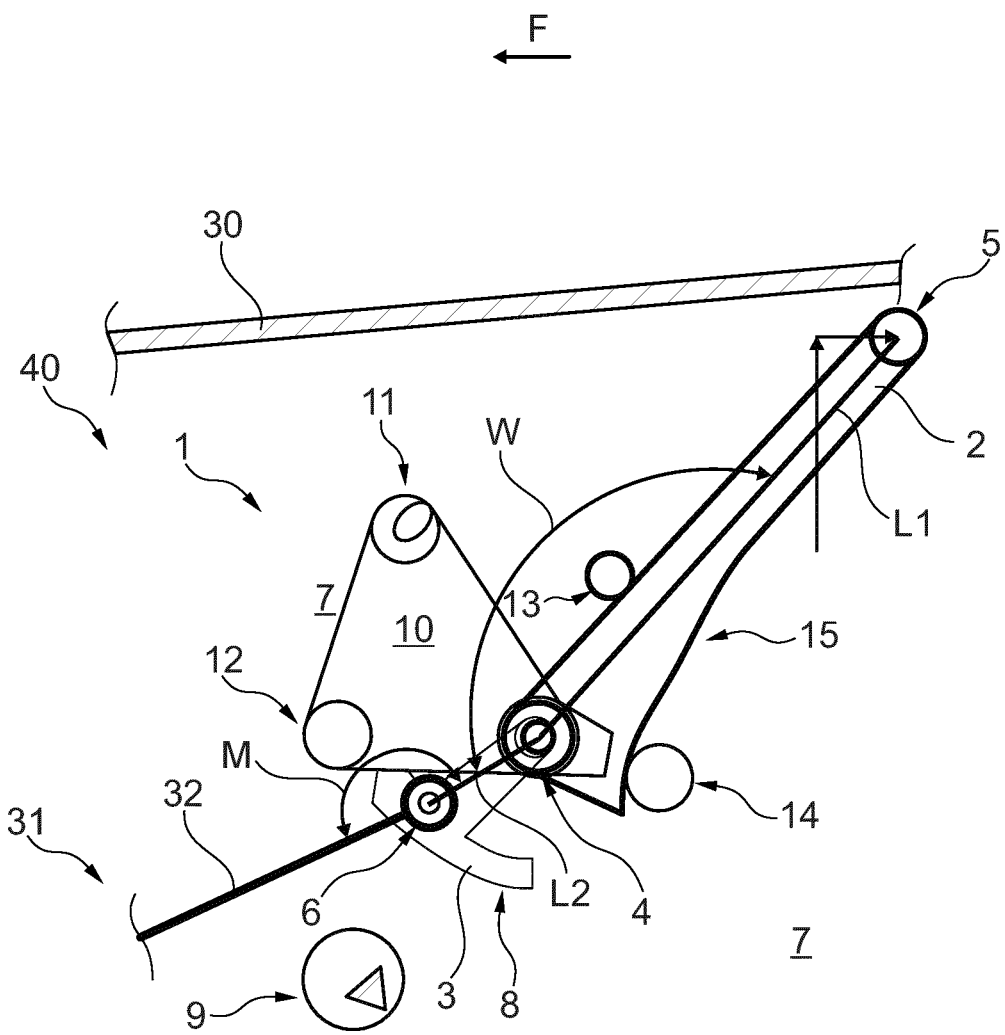
FIG. 4 is a diagrammatic side view of the hinge device from FIG. 3 in the protective position.

FIG. 4 shows a diagrammatic side view of the hinge device 1 from FIG. 3 in the protective position.

In the protective position, the front hood link 2 and the force application element 3 are arranged with respect to one another in such a way that a first connecting line L1 from the first to the second pivot point 4, 5 and a second connecting line L2 from the first to the third pivot point 4, 6 enclose an angle W between 150 degrees and 180 degrees, in order to minimize swings of the front hood 30, brought about by way of the movement from the normal position into the protective position.

It is apparent from FIG. 4, furthermore, that the third and fourth stop element 13, 14 define the position of the front hood link 2 in the protective position and serve as a guide.

It is also apparent from FIG. 4 that the front hood link 2 has the slotted guide track 15 on its outer side, by way of which slotted guide track 15 it has slid along on the fourth stop element 14, in order to pass from the normal position into the protective position. The lifting part or the movement of the front hood 30 is controlled by way of this guidance. An equalization of the positional change of the front hood 30 can be absorbed or compensated for in or by a front hood lock.

In addition, it can be understood from FIG. 4 that the actuator apparatus 31, the force application element 3 and the front hood link 2 are arranged in such a way that an angle M between the second connecting line L2 and a piston rod 32 of the actuator apparatus 1 is between 150 degrees and 180 degrees.

Here, the actuator apparatus 31 is arranged in such a way that the generated force is for the most part oriented counter to the traveling direction F.

As a result, the actuator apparatus 31 not only lifts the front hood 30, but rather also assists to eliminate swinging of the front hood in the hinge device 1.

In the following text, the method of operation of the above-described structural embodiments will be explained.

In the case of an activation of the actuator apparatus 31, the force application element 3 is moved about the first pivot point 4 in the clockwise direction.

As a result of the rotation of the force application element 3, it is released from the first stop element 9 and rotates until it comes into contact with the transmission member 10.

Thereupon, the transmission element 10 is rotated together with the force application element 3 about the fourth pivot point 12 counter to the clockwise direction.

As a result, it is then possible for the actuator apparatus 31 which is still pressing against the force application element 3 to displace the front hood link 2, to be precise from the normal position into the protective position.

This displacement, which is due to a rotation of the transmission member 10, is performed by the actuator apparatus 31 until the front hood link 2 blocks a further movement between the third and fourth stop element 13, 14.

As a result, the hinge device 1 passes from the normal position (cf. FIG. 1) into the protective position (cf. FIG. 4), in which (shown in a simplified manner) the front hood link 2 and the force application element 3 enclose an angle of approximately 170 degrees (or between 150 degrees and 180 degrees).

By way of this proposed protective system 40 or by way of this proposed hinge device 1, an improved swing behavior is achieved in such a way that, when the protective position is reached, the hinge device 1 remains in its position and does not swing between the protective position and the position in front of the normal position. As a result of the integration of the actuator apparatus into the protective system 40, customarily common overshooting (considerably higher lifting of the front hood 30 than required and the associated tolerances during the installation and assembly) can be reduced.

Static certification of the HIC (Head Injury Criterion) can take place as a result of the swing reduction. This can be verified by way of an activating test, the clearance below the engine cover or the front hood being sufficient for the HIC values. Here, the height of the clearance is achieved reliably, and no undershooting takes place either. In the case of a dynamic certification of the front hood, the time of the impact on the front hood is to be calculated, which leads to a considerable rise in the time requirement for the certification and therefore causes higher costs. Therefore, certification costs can also be saved by way of the protective system.

Finally, it is also to be mentioned that each pivot point is configured as a rotational bearing in the form of a mandrel, one bearing bush being used per rotating element.

LIST OF DESIGNATIONS

1 Hinge device
2 Front hood link
3 Force application point
4 First pivot point
5 Second pivot point
6 Third pivot point
7 Hinge lower part
8 Arm
9 First stop element
10 Transmission member
11 Second stop element
12 Fourth pivot point
13 Third stop element
14 Fourth stop element
15 Slotted guide track
30 Front hood (engine hood)
31 Actuator apparatus
32 Piston rod
40 Protective system
L1 First connecting line
L2 Second connecting line W Angle
M Angle
F Traveling direction

The invention claimed is:

1. A hinge device for a front hood of a motor vehicle, by which the front hood is to be opened and closed via the hinge device, and the front hood is to be adjusted from a normal position into a protective position in an event of a collision, the hinge device comprising:
   a single front hood link; and
   a force application element, wherein
   the front hood link has, at its first end, a first pivot point, to which a first end of the force application element is connected pivotably,
   the front hood link has, at its second end, a second pivot point, to which the front hood is fastenable rotatably,
   the force application element has, at its second end, a third pivot point, to which an actuator apparatus is fastenable rotatably, which actuator apparatus is configured to apply a force for moving the third pivot point and adjusting the front hood from the normal position into the protective position, and
   the front hood link and the force application element are arranged in the protective position with respect to one another such that a first connecting line from the first to the second pivot point and a second connecting line from the first to the third pivot point enclose an angle between 150 degrees and 180 degrees, in order to minimize swings of the front hood, brought about by way of movement from the normal position into the protective position.

2. The hinge device according to claim 1, wherein the force application element is configured as a one-armed latch which prevents a movement of the front hood link in the normal position.

3. The hinge device according to claim 2, further comprising:
   a transmission member which, during a transition from the normal position to the protective position, guides the movement of the force application element and the front hood link.

4. The hinge device according to claim 3, further comprising:
   a hinge lower part which is fastened to a vehicle.

5. The hinge device according to claim 4, wherein
   the hinge lower part comprises a first, a third and a fourth stop element which define the protective and normal position of the hinge device.

6. The hinge device according to claim 5, wherein
   the front hood link has, on its outer side, a slotted guide track which is configured such that the front hood link slides along on the fourth stop element, in order to pass from the normal position into the protective position and to stay in position in the normal position.

7. The hinge device according to claim 3, wherein
   the force application element rotates in a clockwise direction about the first pivot point during a transition from the normal position to the protective position,
   the transmission member rotates counter to the clockwise direction about the fourth pivot point, and
   the front hood link is displaced from the normal position into the protective position.

8. A protective system for protecting a person located outside a motor vehicle, the protective system being adjustable from a normal position into a protective position in an event of a collision, the system comprising:
   a front hood of the motor vehicle;
   an actuator for the front hood, which actuator adjusts the front hood from the normal position into the protective position in the event of a collision; and
   a hinge device according to claim 1,
   wherein the actuator is fastened rotatably to the force application element of the hinge device.

9. The protective system according to claim 8, wherein
   the actuator, the force application element and the front hood link are arranged such that an angle between the second connecting line and a piston rod of the actuator is between 150 degrees and 180 degrees.

10. A vehicle comprising a protective system according to claim 8.

* * * * *